(12) United States Patent
Ganguly et al.

(10) Patent No.: US 10,417,747 B2
(45) Date of Patent: Sep. 17, 2019

(54) ABERRANT PIXEL DETECTION AND CORRECTION

(71) Applicant: Varex Imaging Corporation, Salt Lake City, UT (US)

(72) Inventors: Arundhuti Ganguly, San Jose, CA (US); Ivan P Mollov, San Jose, CA (US); Carlo Tognina, San Jose, CA (US); Maxwell J. Allen, San Jose, CA (US); Paul Kenneth Kuhn, Salt Lake City, UT (US); Gregg Hawkes, Salt Lake City, UT (US)

(73) Assignee: Varex Imaging Corporation, Salt Lake City, UT (US)

( * ) Notice: Subject to any disclaimer, the term of this patent is extended or adjusted under 35 U.S.C. 154(b) by 97 days.

(21) Appl. No.: 15/821,633

(22) Filed: Nov. 22, 2017

(65) Prior Publication Data
US 2019/0156462 A1 May 23, 2019

(51) Int. Cl.
*H04N 5/217* (2011.01)
*G06T 5/00* (2006.01)
*H04N 5/225* (2006.01)
*G06K 9/62* (2006.01)

(52) U.S. Cl.
CPC .......... *G06T 5/002* (2013.01); *G06K 9/6202* (2013.01); *H04N 5/2256* (2013.01)

(58) Field of Classification Search
None
See application file for complete search history.

(56) References Cited

U.S. PATENT DOCUMENTS

| 7,623,162 | B2 * | 11/2009 | Inaba | H04N 5/361 348/241 |
| 8,885,077 | B2 | 11/2014 | Kolli | |
| 8,922,681 | B2 * | 12/2014 | Suzuki | H04N 5/367 348/244 |
| 9,430,826 | B2 | 8/2016 | Stowasser | |
| 2004/0119856 | A1 | 6/2004 | Nishio et al. | |
| 2008/0285845 | A1 | 11/2008 | Kang | |
| 2012/0050586 | A1 | 3/2012 | Kanemitsu et al. | |
| 2012/0300101 | A1 | 11/2012 | Ichikawa | |
| 2017/0007859 | A1 | 1/2017 | Fromage | |
| 2017/0126999 | A1 | 5/2017 | Elikhis et al. | |

FOREIGN PATENT DOCUMENTS

| EP | 0998138 A2 | 5/2000 |
| WO | 2016/137972 A2 | 9/2016 |

OTHER PUBLICATIONS

Jimmy Li et al, Dynamic Range Bad Pixel Correction within Edge-Preserving Colour Filter Array Demosaicking, Sep. 17, 2011.
International Search Report and Written Opinion of the International Searching Authority, International application No. PCT/US2018/062142, dated Nov. 20, 2018.

* cited by examiner

*Primary Examiner* — Gary C Vieaux
(74) *Attorney, Agent, or Firm* — Laurence & Phillips IP Law

(57) ABSTRACT

Some embodiments include determining a value of an identified pixel of a plurality of pixels of an image from a detector; determining a noise value based on the value of the identified pixel and the detector; determining a range based on the noise value and the value of the identified pixel; comparing the range and a value of at least one pixel of the pixels other than the identified pixel; and adjusting the value of the identified pixel in response to the comparison.

21 Claims, 12 Drawing Sheets

FIG. 5I
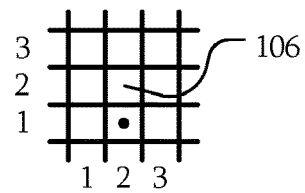
FIG. 5J
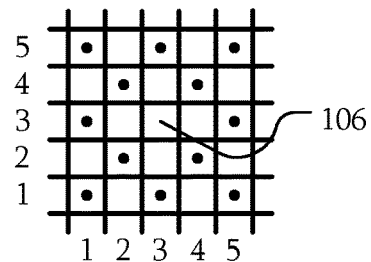
FIG. 5K
| R | G | R | G | R | G | R | G | R | G |
|---|---|---|---|---|---|---|---|---|---|
| G | B. | G | B. | G | B. | G | B | G | B |
| R | G | R | G | R | G | R | G | R | G |
| G | B. | G | B | G | B. | G | B | G | B |
| R | G | R | G | R | G | R | G | R | G |
| G | B. | G | B. | G | B. | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |
106

ABERRANT PIXEL DETECTION AND CORRECTION

BACKGROUND

This disclosure relates to aberrant pixel detection and correction.

Digital images may be generated by an imaging system. Various aspects of the imaging system, the subject, or the like may introduce aberrant pixels into the image. For example, an aberrant pixel may be an unusually bright pixel, an unusually dark pixel, a pixel with a value that does not represent the expected image with an accuracy similar to other pixels in the image, or the like.

BRIEF DESCRIPTION OF SEVERAL VIEWS OF THE DRAWINGS

FIGS. 5A-K are diagrams illustrating examples of pixels that are compared according to some embodiments.

DETAILED DESCRIPTION

As will be described in further detail below, in some embodiments, an imaging system includes an x-ray detector. A scintillator includes a luminescent or scintillation material which generates visible light when excited by ionizing radiation, such as x-rays (i.e., converts x-ray photons to light). The scintillator is disposed between the x-ray source and a detector. However, in some circumstances, a higher energy x-ray photon may penetrate the scintillator and generate an unusually bright pixel. These aberrant pixels may confuse a user of the image. For example, the aberrant pixel or pixels in an x-ray image may be an irritant to a radiologist or may be confused with actual features of the image.

In other embodiments, during operation, a pixel may fail. The failed pixel may result in an abnormally dark or bright pixel. These failures may occur in x-ray detectors, visible light detectors, or other types of detectors.

As will be described in further detail below, an imaging system according to some embodiments may detect and correct such aberrant pixels.

Figure 1A:
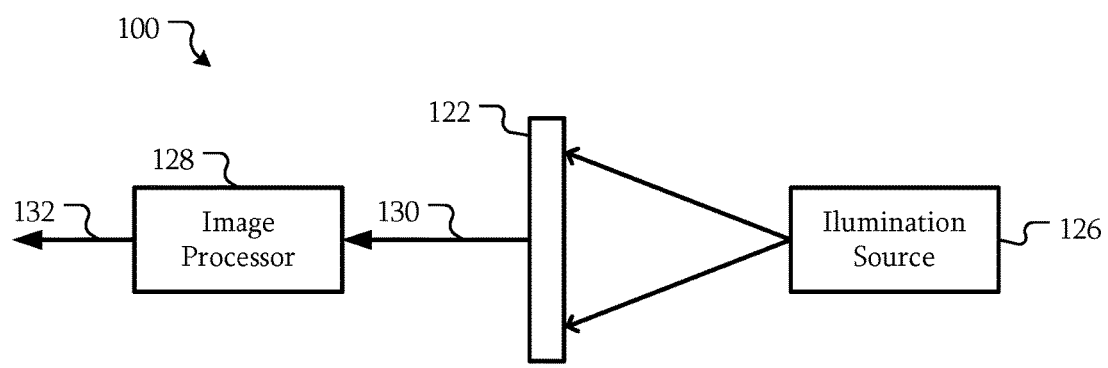
FIG. 1A is a block diagram of an imaging system according to some embodiments.

FIG. 1A is a block diagram of an imaging system according to some embodiments. The imaging system 100 includes a detector 122 and an image processor 128. The detector 122 is configured to receive illumination from an illumination source 126.

The illumination source 126 may be any source of illumination to be detected by the detector 122. For example, the illumination source 126 may include an x-ray source and a specimen disposed between the x-ray source and the detector 122. Thus, the illumination source 126 provides an image to be detected representing the selective absorption of the x-rays. In another example, the illumination source 126 may include an object and light from the object focused on to the detector 122.

The detector 122 may be any detector configured to detect an image from the illumination source. For example, with an x-ray illumination source 126, the detector 122 may include a scintillator to convert the x-ray photons into visible light photons. The detector may include a suitable array of pixels, such as a CMOS (complementary metal oxide semiconductor) sensor. However, different types of sensors may be used. Although a detector 122 configured to detect x-ray photons is used as an example, the detector 122 may be configured to detect other types of signals, such as visible, infrared or ultraviolet light, from the illumination source or from an illuminated scene through an objective or lenses. For example, the detector 122 may be a visible color image detector with pixels configured to sense appropriate wavelengths.

The image processor 128 is a circuit configured to receive the image 130 and generate an output image 132 with at least some aberrant pixels corrected. For example, the image processor 128 may include a general purpose processor, a digital signal processor (DSP), an application specific integrated circuit, a microcontroller, a programmable logic device, discrete circuits, a combination of such devices, or the like. Although one processor 128 is illustrated, in other embodiments, any number of image processors 128 may be present.

Figure 1B:
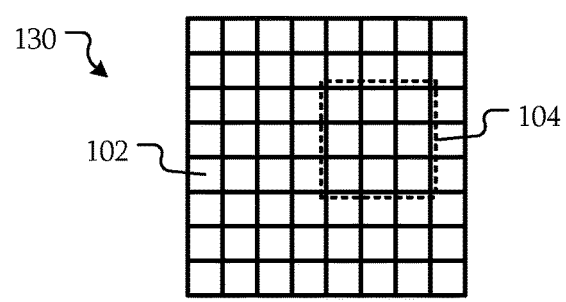
FIG. 1B is a diagram of an image according to some embodiments.

FIG. 1B is a diagram of an image according to some embodiments. Referring to FIGS. 1A and 1B, an image 130 includes multiple pixels 102. The image 130 is generated by the detector 122. This image 130 may have aberrant pixels. A particular portion 104 of the image 130 is identified by the dashed rectangle. Although a portion 104 of the image 130 having nine pixels 102 has been illustrated as an example, in other embodiments, the relevant portion 104 may include more or less pixels 102. In addition, although the portion 104 has been illustrated as having sides with an equal number of pixels, in other embodiments, the length of the sides may be different.

FIGS. 2A-F are charts illustrating detection of an aberrant pixel according to some embodiments. Referring to FIGS. 1A-B and 2A-F, in some embodiments, values of pixels 102 are represented by the vertical lines. Here, the values for three pixels are represented, pixels 102-1 and 102-2, and an identified pixel 106. These pixels 102-1, 102-2, and 106 are pixels 102 that are within the particular portion 104 of the image 130. The values of pixels 102-1 and 102-2 and an identified pixel 106 may have different values between FIGS. 2A-F. Although the pixels 102-1, 102-2, and 106 are illustrated as being in a line, the pixels 102-1, 102-2, and 106 may represent pixels in other positions, such as the pixels 102-1 and 102-2 being on the same side of pixel 106, the pixels 102-1, 102-2, and 106 lying on two intersecting lines, or the like.

As will be described in further detail below, a value of an identified pixel 106 is determined. A range 108 is determined based on the value of the identified pixel 106. The range 108 is a range of expected values of other pixels 102, such as neighboring or adjacent pixels, based on the value of the identified pixel 106. For example, the range 108 may be calculated by determining an expected distribution values of the other pixels 102. In a particular example, a standard deviation of expected values of other pixels 102 may be used to generate the range 108.

The range 108 is compared with values of at least one other pixel 102. In these examples, two pixels are illustrated; however, in other embodiments, a different number of pixels may be compared with the range. This comparison may be used to determine whether the identified pixel 106 is an aberrant pixel.

Figure 2A:
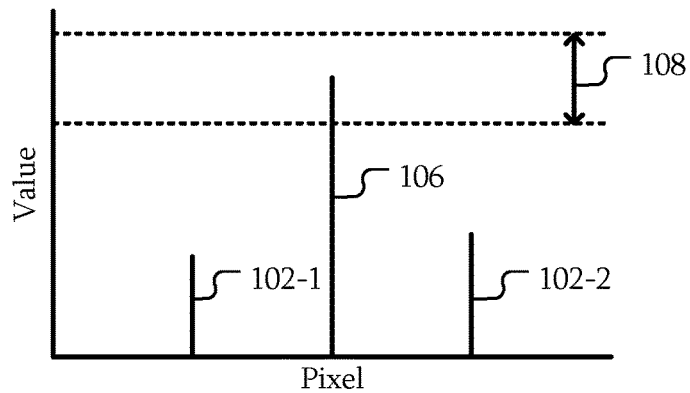
FIGS. 2A-F are charts illustrating detection of an aberrant pixel according to some embodiments.

Referring to FIG. 2A, in this example, each of the values of the pixels 102-1 and 102-2 are outside of the range 108. The range 108 represents expected values of other pixels given the value of the identified pixel 106. Here, the values of both pixels 102-1 and 102-2 are below the range 108. As both pixels 102-1 and 102-2 are outside of that expected range, the identified pixel 106 is likely an aberrant pixel. Accordingly, the identified pixel 106 may be classified as an aberrant pixel.

Figure 2B:
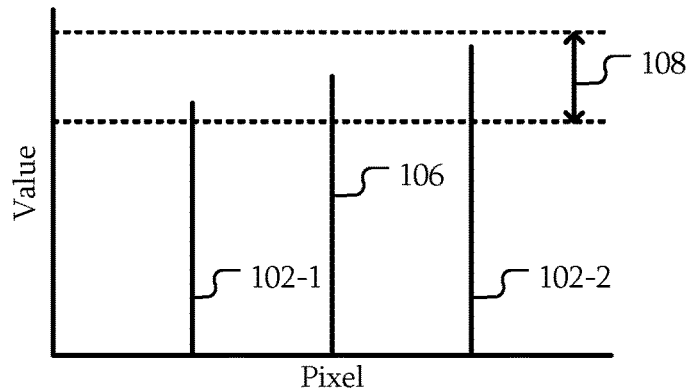

Referring to FIG. 2B, in this example, each of the values of the pixels 102-1 and 102-2 are within the range 108. Accordingly, the identified pixel 106 may be classified as a normal pixel, i.e., not an aberrant pixel. As the values of both pixels 102-1 and 102-2 are within the range 108 of expected values given the value of the identified pixel 106, the identified pixel 106 is likely a normal pixel.

Figure 2C:
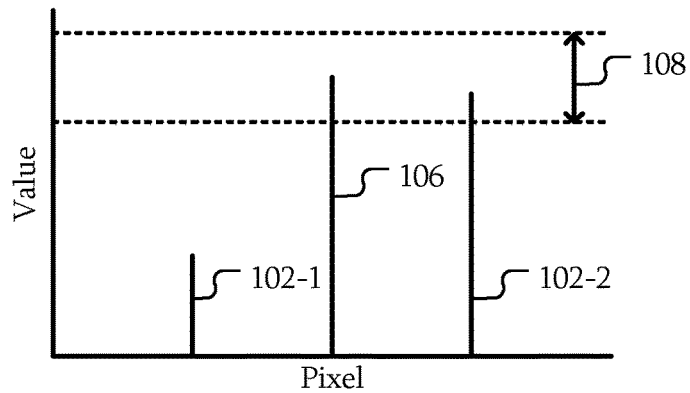

Referring to FIG. 2C, in this example, the value of pixel 102-1 is outside of the range 108 and the value of pixel 102-2 is within the range 108. In this example, the identified pixel 106 may be classified as a normal pixel, i.e., not an aberrant pixel. For example, the identified pixel 102 and the pixel 102-2 may be pixels at the edge of a change in features of the image. As a result, the pixel 102-1 has a different value outside of the range 108. However, as the pixel 102-2 has a value that is within the expected range 108, the pixel 106 may be accurately representing the associated portion of the image 130.

Figure 2D:
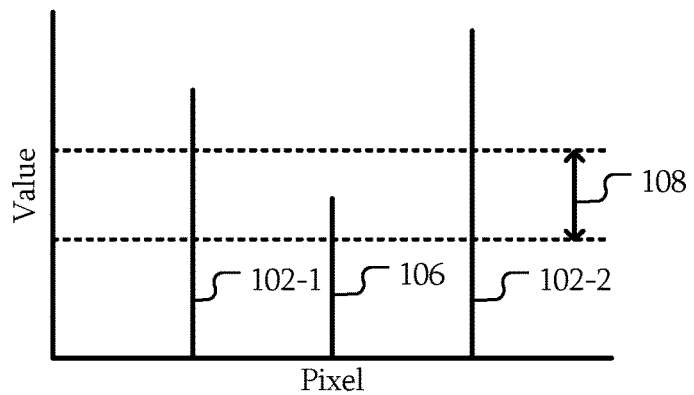

Referring to FIG. 2D, in this example, each of the values of the pixels 102-1 and 102-2 are above of the range 108. Accordingly, the identified pixel 106 may be classified as an aberrant pixel. As both pixels are above the range 108 of expected values given the value of the identified pixel 106, the identified pixel 106 is likely an aberrant pixel that has a spuriously low value.

Figure 2E:
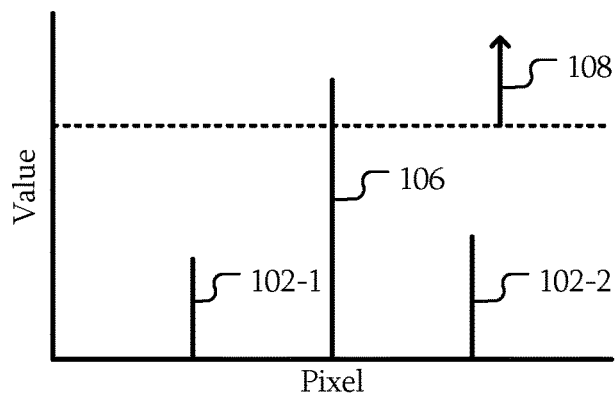
Figure 2F:
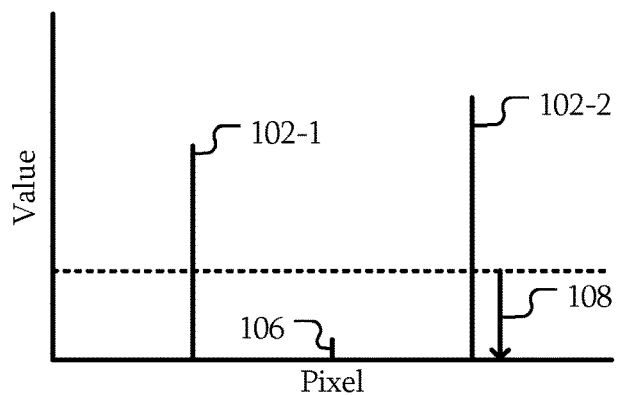

In FIGS. 2A-D, a range 108 having an upper limit and a lower limit has been used as an example. In FIGS. 2E and 2F, ranges 108 with one limit and a direction are illustrated as other examples. Referring to FIG. 2E, in this example the range 108 has a lower limit and extends to higher values. In this particular example, the values of both pixels 102-1 and 102-2 are below the range 108. The identified pixel 106 may be classified as an aberrant pixel as described with respect to FIG. 2A. However, in other examples, one or more of the values of the pixels 102-1 and 102-2 may be above the lower limit of the range 108. The identified pixel 106 may be classified as described above with respect to FIGS. 2B or 2C.

Referring to FIG. 2F, in this example the range 108 has an upper limit and extends to lower values. In this particular example, the values of both pixels 102-1 and 102-2 are above the range. The identified pixel 106 may be classified as an aberrant pixel as described with respect to FIG. 2D. However, in other examples, one or more of the values of the pixels 102-1 and 102-2 may be below the upper limit of the range 108. The identified pixel may be classified as described above with respect to FIGS. 2B or 2C.

Once characterized as a normal pixel or an aberrant pixel, the value of the pixel may be adjusted based on the comparison. For example, the value of an aberrant pixel may be replaced with a value based on one or more other pixels 102. In a particular example, the replacement value may be a median, average, or other combination of multiple pixels 102, such as all or a subset of less than all of immediately adjacent pixels 102, pixels within a distance from the identified pixel 106, or the like. Any technique may be used to generate a replacement value for the identified pixel 106.

Referring to FIGS. 2A and 2E, in some embodiments, the lower limit of the ranges may be calculated by subtracting a value from the value of the identified pixel 106. For example, the value may be based on the value of the identified pixel 106, a noise level, a combination of such values, or the like. Thus, the acceptable range 108 associated with the identified pixel 106 has a lower limit that is based on the value of the identified pixel 106 with an amount subtracted to accommodate expected variations in pixel performance, noise level, image differences, or the like. Similarly, referring to FIGS. 2A and 2F, the upper limit may be calculated in a similar manner by adding a value to the value of the identified pixel. In some embodiments, where an upper and lower limit are used, the value added or subtracted to generate the corresponding limit may, but need not be the same.

FIGS. 3A-3D are diagrams of portions of the image of FIG. 1B according to some embodiments. These figures illustrate various combinations of pixels 102 with spurious values (illustrated with shading) and pixels 102 with expected values (no shading). Here, a pixel 102 with a spurious value is a pixel 102 having a value that is significantly different from an expected value for the pixel 102. For example, the pixel 102 may have failed and be fixed at a high or low value. In another example, a transient effect may cause an otherwise properly operating pixel 102 to generate a spurious value. As described above, an unabsorbed x-ray photon may be detected by a pixel 102 of a detector and create a spurious value.

In these examples, a number of pixels 102 other than the identified pixel 106 that are used to determine if the identified pixel 106 is an aberrant pixel includes the eight adjacent pixels 102. However, as will be described in further detail below, other pixels 102 including a smaller number of the adjacent pixels 102 and/or pixels 102 that are not immediately adjacent may be used to determine if the identified pixel 106 is an aberrant pixel.

Figure 3A:
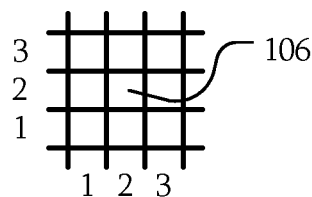
FIGS. 3A-D are diagrams of portions of the image of FIG. 1B according to some embodiments.

Referring to FIG. 3A, in this example, an identified pixel 106 is located at the center of multiple pixels 102. However, none of the pixels 102, including the identified pixel 106, has a spurious value. Accordingly, a range based on the value of the identified pixel 106 may include the values of all of the immediately adjacent pixels 102. The identified pixel 106 may be classified as a normal pixel in this case.

Figure 3B:
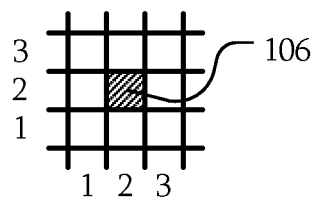

In contrast, referring to FIG. 3B, the identified pixel 106 has a spurious value. Accordingly, a range calculated as described above may not include the normal values of the adjacent pixels 102. For example, the values of the other pixels 102 may all be below the range as illustrated in FIG. 2A. The identified pixel 106 may be classified as an aberrant pixel in this case.

Figure 3C:
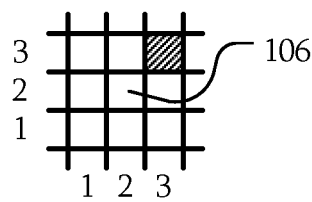

Referring to FIG. 3C, in this example the identified pixel 106 has a normal value. However, one of the adjacent pixels 102 in row 3, column 3 has a spurious value. As a result, the range generated from the identified pixel 106 may include the values of the pixels 102 with expected values, but not the value of the pixel 102 with the spurious value. Here, the identified pixel 106 is classified as a normal pixel as at least some of values of the adjacent pixels 102 fall within the range associated with the identified pixel 106. That one pixel 102 has a spurious value does not cause the identified pixel 106 to be classified as an aberrant pixel.

In addition, the handling of the value of the pixel 102 in row 3, column 3 may have other benefits when the value is not spurious. For example, the value of the pixel 102 in row 3, column 3 may be an expected value, such as a value due to an abrupt change in the actual illumination of the corresponding pixels of a detector 122. Here, the value of the identified pixel 106 is not classified as aberrant, even when adjacent to a pixel 102 with a value that is expected, but would otherwise be outside of the range associated with the identified pixel 106.

Figure 3D:
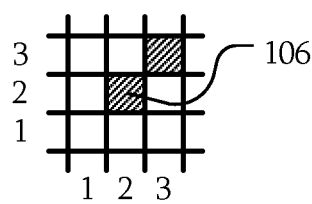

Referring to FIG. 3D, in this example, both the identified pixel 106 and the pixel 102 in column 3, row 3 have spurious values. In particular, the pixel 102 in column 3, row 3 has a value that is within a range generated based on the spurious value of the identified pixel 106. Accordingly, at least one pixel 102 is within the range based on the spurious value of the identified pixel 106. As a result, the identified pixel 106 may be erroneously classified as a normal pixel. However, in some embodiments, the likelihood of two adjacent pixels with spurious values may be low. Thus, while a false negative is possible, the likelihood of an occurrence may be low.

In a case where one or both of the identified pixel 106 and the pixel 102 in column 3, row 3 do not have spurious values, the value of the identified pixel 106 may be preserved. That is, the identified pixel 106 and the pixel in column 3, row 3 may be values that may appear to be spurious relative to other pixels 102 in the local region, but are actually legitimate image features, such as features of an edge. Even though the pixels 102 other than the identified pixel 106 and the pixel 102 in column 3, row 3 may be outside of a range based on the value of the identified pixel 106, the value of the pixel in column 3, row 3 may be within that range as they are pixels associated with an edge in the image. Accordingly, the identified pixel 106 may be classified as a normal pixel even when that same value in an isolated pixel may have been classified as an aberrant pixel. Thus, isolated aberrant pixels may be identified while a false positive on a feature such as an edge may be avoided.

Figure 4:
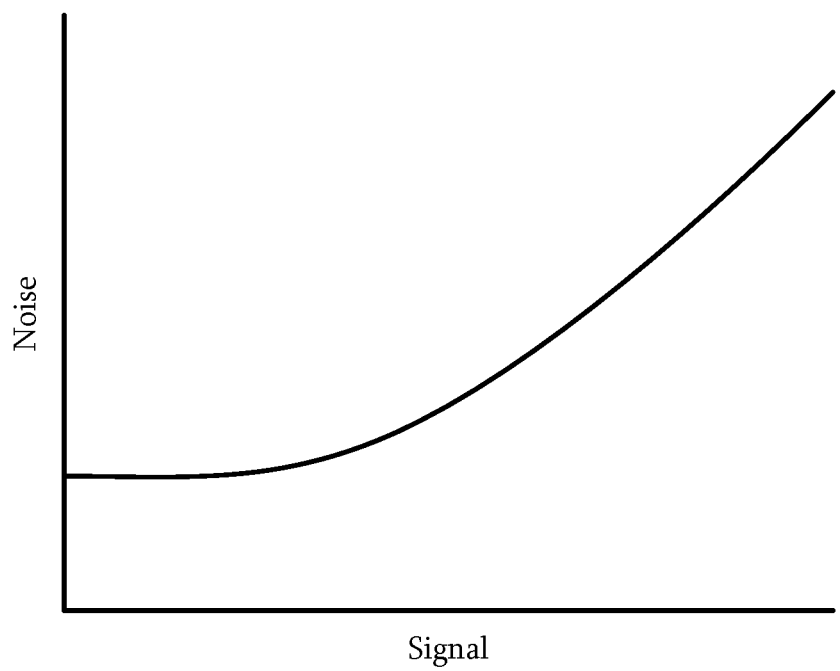
FIG. 4 is a chart illustrating a relationship of signal and noise in a detector according to some embodiments.

FIG. 4 is a chart illustrating a relationship of signal and noise in a detector according to some embodiments. Referring to FIGS. 1A, 1B, and 4, in some embodiments, the range that is compared to values of other pixels 102 may be based on a noise value. The chart 400 illustrates an example of a relationship between a signal level and expected noise for a detector 122 or imaging system 100. In some embodiments, the axes of the chart may be logarithmic. The relationship of signal to noise illustrated in FIG. 4 is merely an example. In other embodiments, the noise model may result in a relationship that is different than that illustrated.

The expected noise for a given signal level may be calculated in a variety of ways. For example, in some embodiments, an equation may be used to calculate a noise value from a signal value. In other embodiments, a look-up table may be used to convert a signal value into a noise value. Equations 1 and 2 below are examples of how to calculate a noise value.

$$\eta = \sqrt{K \cdot p + \eta_{elec}^2} \quad (1)$$

$$m\eta = A\sqrt{p} + B \quad (2)$$

In the above example, $\eta$ is the total expected noise value (one standard deviation) for a given pixel level p, K is a constant, and $\eta_{elec}$ represents electrical noise. In the example of Equation 2, a scaled estimated noise value $m\eta$ may be approximated where A and B are empirically determined constants.

The estimated noise value may be used to determine the range 108 described above. The estimated noise value may be scaled by a constant and added to the pixel value to generate an upper limit for the range 108 and/or scaled by the same or different constant and subtracted from the pixel value to generate a lower limit for the range 108.

In addition to a value representing an amount of noise, additional values may be combined with the pixel value and the noise value to accommodate an amount of changes due to expected changes in the image. For example, in some embodiments, an expected change in the image across the pixels compared with the range may be negligible, i.e., the noise may dominate over such variations. However, in other embodiments other values may be added and/or subtracted to accommodate such an expected potential local change in actual pixel values.

In some embodiments, a noise model may be prepared for a particular detector 122 and/or for a particular mode of operation of the detector. That is, the noise model may be different for different imaging systems 100 and mode of operations of the same. By using a noise model specific to the detector 122 and, in some embodiments, for every particular mode of operation, an accuracy of the expected range 108 and consequently, the accuracy of detection of aberrant pixels may be improved.

In some embodiments, the signal level used to predict the noise in the vicinity of the identified pixel 106 may be derived from the neighboring pixels 102.

Figure 5A:
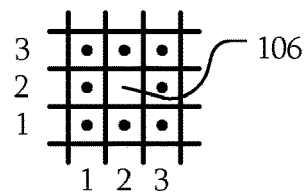

FIGS. 5A-K are diagrams illustrating examples of pixels that are compared according to some embodiments. In these figures, dots in a pixel 102 indicate that the value of the pixel 102 is compared with the range associated with the identified pixel 106. Referring to FIG. 5A, in some embodiments, all of the immediately adjacent pixels 102, including immediately diagonally adjacent pixels 102 (eight adjacent pixels 102), are compared to a range associated with the identified pixel 106. The description of FIGS. 3A-3D used this configuration of pixels 102 as the pixels 102 other than the identified pixel 106.

Figure 5B:
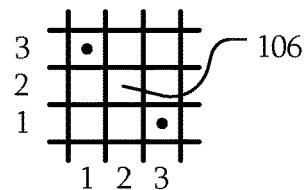
Figure 5C:
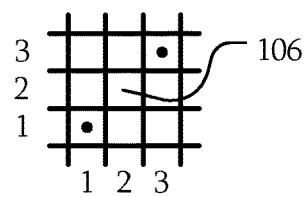
Figure 5D:
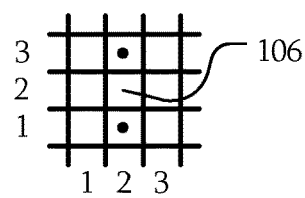
Figure 5E:
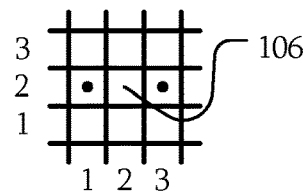

However, in other embodiments, values of less than all of the immediately adjacent pixels may be compared with the range associated with the identified pixel 106. Referring to FIGS. 5B and 5C, in some embodiments, the other pixels 102 (two adjacent pixels 102) are adjacent on a single diagonal line with respect to the identified pixel 106 and the layout of the pixels 102. Referring to FIGS. 5D and 5E, the other pixels 102 (two adjacent pixels 102) are adjacent on a single direction of the layout of the pixels 102, such as those in a row or a column, in line with the identified pixel 106.

Figure 5F:
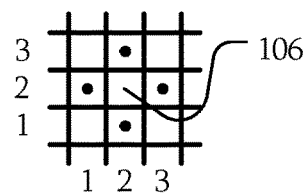
Figure 5G:
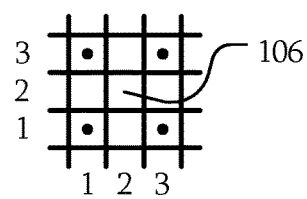

Referring to FIGS. 5F and 5G, in some embodiments, the values of all horizontally and vertically adjacent pixels 102 (four adjacent pixels 102), as in FIG. 5F, or all diagonally adjacent pixels 102 (four adjacent pixels 102), as in FIG. 5G, may be used as the other pixels 102 that are compared with the range associated with the identified pixel 106.

Figure 5H:
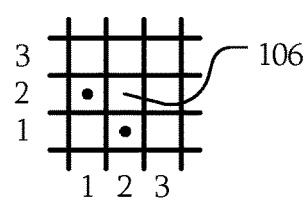

In other embodiments, the pixels 102 may have different locations, including location that are not symmetric with respect to the identified pixel 106. Referring to FIG. 5H, in this example, values from pixels 102 (two adjacent pixels 102) in row 1, column 2 and row 2, column 1. In some embodiments, this configuration may improve processing performance. In particular, only one pixel 102 in each of the row and column directions is used. Accordingly, for each identified pixel 106, the associated range is only compared with the values of two other pixels 102.

Referring to FIG. 5I, in some embodiments, the value of only one pixel 102 (e.g., one adjacent pixel 102) is compared with the range associated with the identified pixel 106. Although a particular pixel 102 has been used as an example in FIG. 5I, the single pixel may be in a different relative location in other embodiments.

Referring to FIG. 5J, in some embodiments, pixels other than and/or in addition to immediately adjacent pixels may be used as the source of values to be compared. In this example, some pixels are beyond the immediately adjacent pixels (e.g., adjacent to the immediately adjacent pixels). Although a particular pattern of pixels 102 has been used as an example, in other embodiments, different patterns may be used. In addition, although pixels 102 that are immediate adjacent to the identified pixel 106 have been used in this example, in other embodiments, less or no immediately adjacent pixels 102 may be used.

Referring to FIG. 5K, in some embodiments, the image may have multiple channels. In this example, the image is formed of red R, green G, and blue B channels in a Bayer pattern. The immediately adjacent blue pixels B for the identified blue pixel 106 in a configuration similar to that of FIG. 5A are used as an example of pixels having values to be compared with the range associated with the identified blue pixel 106. However, as described above, the particular pixels may be different.

In addition, the processing of the image with multiple channels may be performed for one or more of the channels, including all of the channels. For example, in some embodiments, only the green channel may be processed as described herein; however, in other embodiments, each of the red, green, and blue channels may be processed.

Although color channels have been used as examples of different channels, in other embodiments, the type of the channel may be different. For example, a channel of the image may be a non-visible light channel, a depth channel, or other types of channels.

Although the above examples of pixels with values that are compared with the range associated with the identified pixel 106 have various configurations, any configuration of pixels may be used.

In addition, although examples above have used the result of the comparison of the value of pixels to the range associated with the identified pixel 106 on a logically equal basis, in other embodiments, the results of the comparison of the values of individual pixels may be logically combined in different ways. Using FIG. 5B as an example, if any of the pixels with dots have a value that is within the range associated with the identified pixel 106, the identified pixel 106 may be classified as a normal pixel. In other words, the determination of whether the identified pixel 106 is a normal or aberrant pixel is based on the logical OR of the results of the individual comparisons. However, in other embodiments, the comparison results may be combined such that both pixels 102 of at least one of the diagonal pairs of pixels must be within the range. That is, the result may be ($P_{11}$ AND $P_{33}$) OR ($P_{31}$ AND $P_{13}$) where $P_{XY}$ is the result of the comparison for the pixel at row X and column Y. Although two examples have be provided, in other embodiments, the individual comparison results may be logically combined in different ways.

Figure 6A:
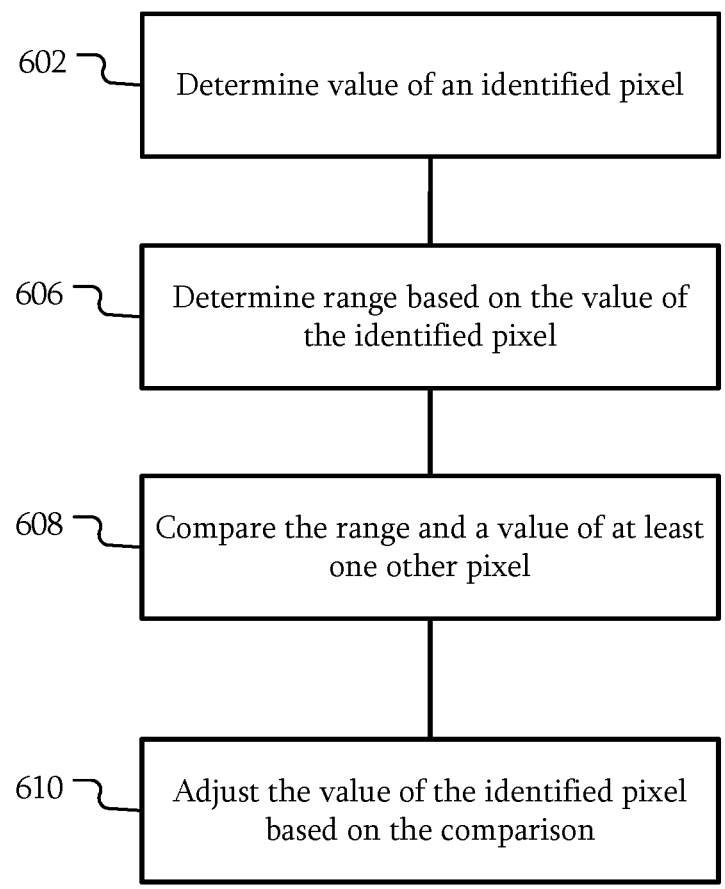
FIGS. 6A-C are flowcharts of detecting and correcting aberrant pixels according to some embodiments.
Figure 6B:
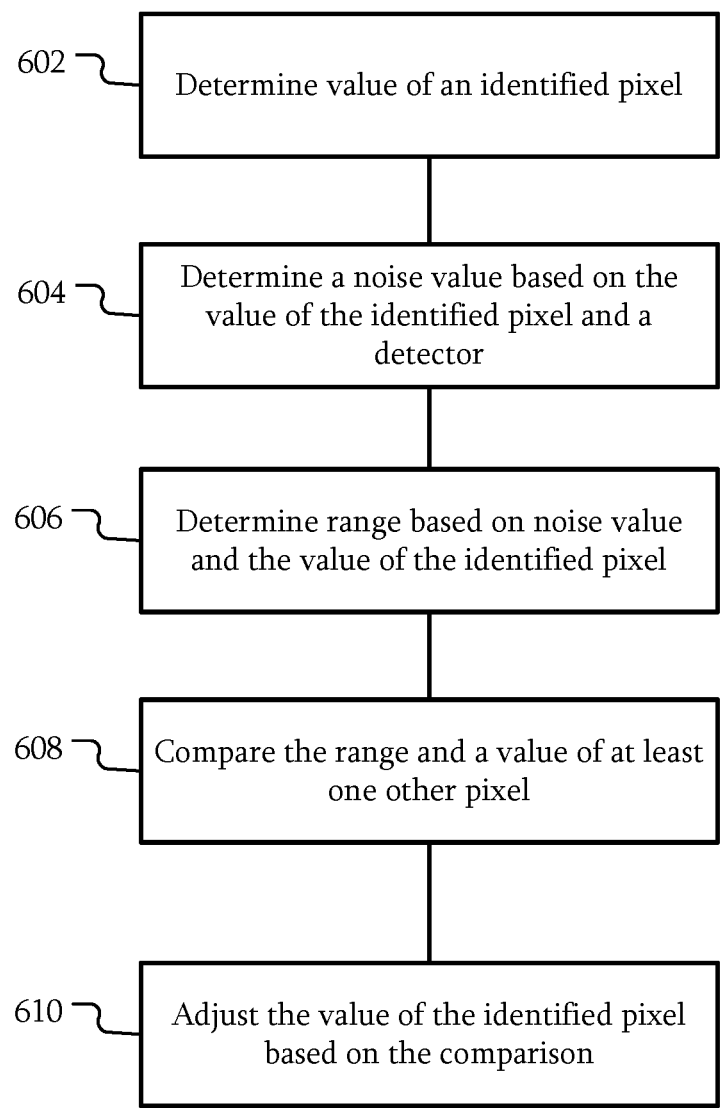

FIGS. 6A-B are flowcharts of detecting and correcting aberrant pixels according to some embodiments. In 602, a value of an identified pixel is determined. For example, an image may be received by an image processor. The image processor may be iterating through the pixels of the image. A current pixel may be an identified pixel. The image processor may read the value of that pixel.

In 606, a range is determined based on the value of the pixel. For example, an image processor may use an equation to convert the value of the pixel into a range. In another example, the image processor may access a look-up table using the value of the pixel to determine a parameter to determine the range. As described above, the range may be determined in a variety of ways.

In 608, the value of at least one other pixel is compared with the range. As described above a variety of different pixels may be used as the source of the values for the comparison. In particular, the image processor may access the values of the other pixels and compare the values with the range.

In 610, the value of the pixel is adjusted based on the comparison in 608. In some embodiments, the value of the identified pixel is adjusted only if the identified pixel is classified as an aberrant pixel. In some embodiments, an image processor may generate a new value for the identified pixel based on the at least one pixel of the pixels other than the identified pixel. The at least one other pixel may be the same as or different from the at least one pixel used to determine if the identified pixel is an aberrant pixel.

In a particular example, a smaller set of pixels may be used to determine if the identified pixel is an aberrant pixel. As each pixel of an image may be processed as an identified pixel to determine if it is an aberrant pixel. However, as less than all of the pixels of an image, and possibly very few pixels, may be determined to be aberrant pixels, a greater number of other pixels may be used in generating a new value as the impact of the additional pixels may have a reduced impact on processing time.

Referring to FIG. 6B, the processing may be similar to that of FIG. 6A. However, in some embodiments, in 604, a noise value may be determined based on the value of the identified pixel and a detector. For example, as described above, a noise model may be prepared for a detector in a particular configuration and/or operating mode. The noise model may be represented by an equation, a look-up table, a combination of the two, or the like. The image processor may use the equation, look-up table, a combination of the two, or the like.

In 607, the range may be determined based on the value of the pixel, but also based on the noise value determined in 604. Accordingly, the range may reflect factors that would impact the expected range of values for adjacent or nearby pixels given the current value of the identified pixel.

Figure 6C:
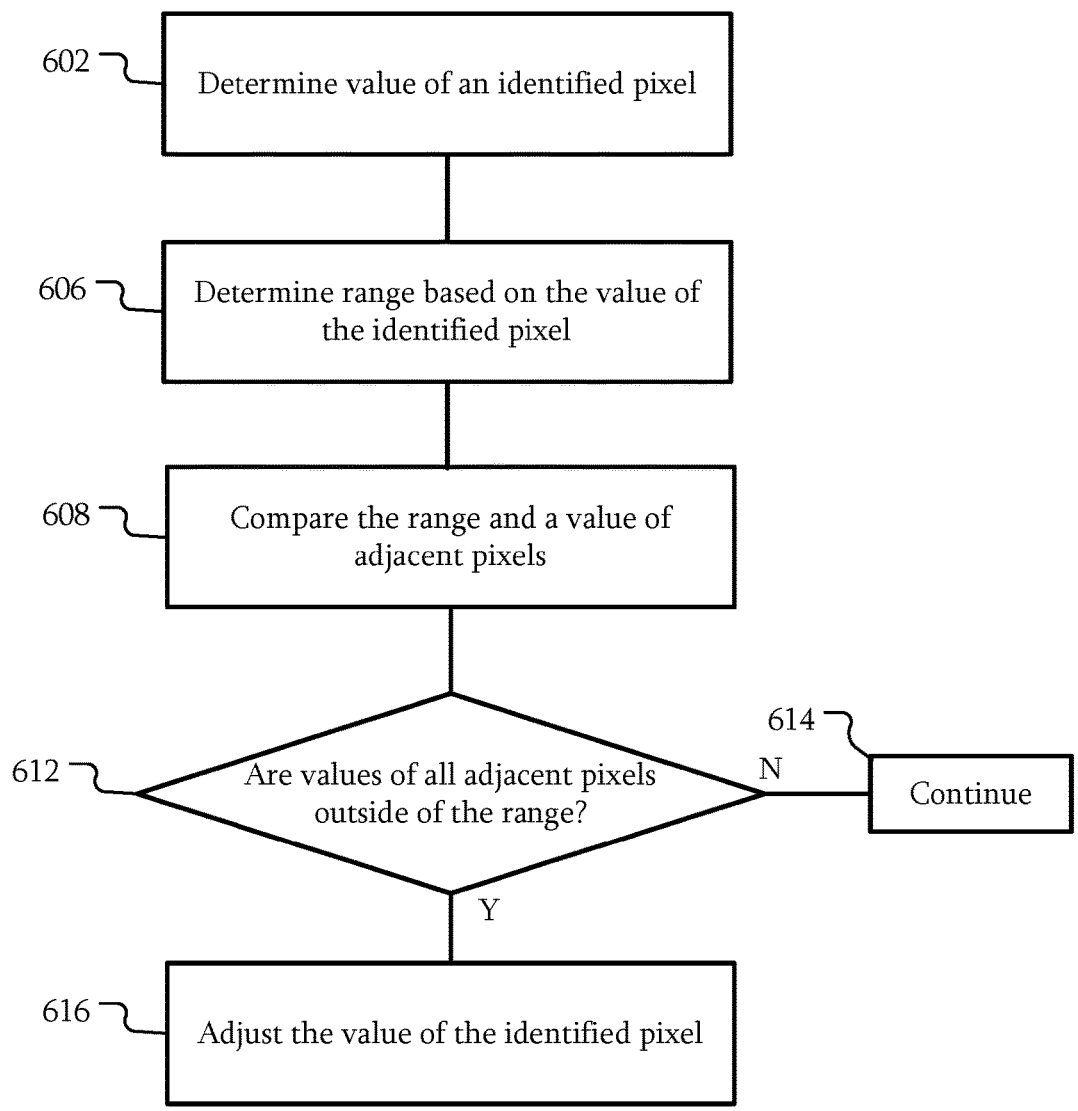

Referring to FIG. 6C, the processing may be similar to that of FIGS. 6A or 6B. However, in some embodiments, in 612, a decision is made whether values of all adjacent pixels are outside of the range associated with the identified pixel. If all of the values are outside of the range, the value of the identified pixel is adjusted in 616. If not, processing continues in 614.

Figure 7A:
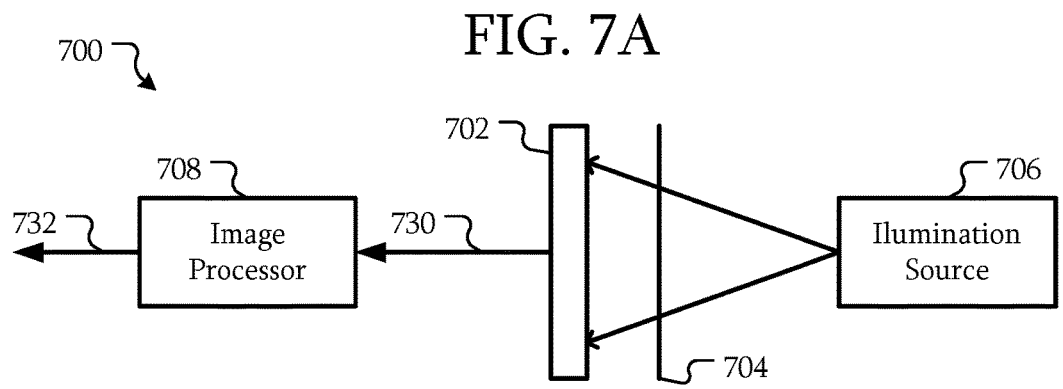
FIG. 7A is a block diagram of an imaging system according to some embodiments.

FIG. 7A is a diagram of an imaging system according to some embodiments. In some embodiments, a system 700 includes a detector 702, an illumination source 706, and an image processor 708 similar to the corresponding components of FIG. 1A. However, the system 700 includes a structure 704. The structure 704 is disposed between the illumination source 706 and the detector 702. For example, the structure 704 may be an antiscatter grid of x-ray imaging system. The structure 704 is disposed such that the structure 704 creates artifacts in an image generated by the detector 702 by modulating the illumination from the illumination source 706.

Figure 7B:
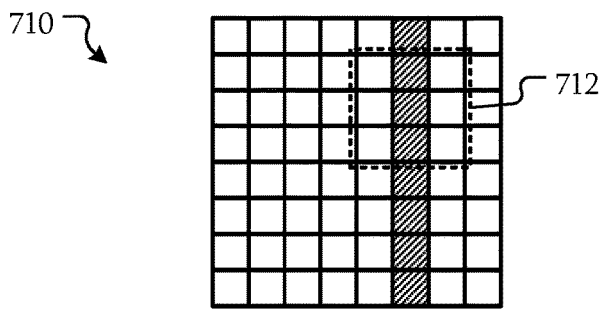
FIG. 7B is a diagram of an example of an image generated by the system of FIG. 7A.

FIG. 7B is a diagram of an example of an image generated by the system of FIG. 7A. Referring to FIGS. 7A and 7B, image 710 is an example of an image generated with a structure 704. The shaded pixels represent changes to the image due to the structure 704. Here, the effect of a vertically oriented structure is represented by the vertical line of shaded pixels. However, in other embodiments, the structure 704 may have a different orientation and/or have effected that extend in more than one direction.

Figure 7C:
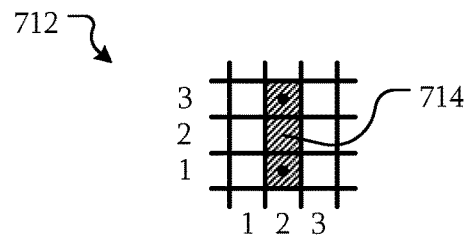
FIG. 7C is a diagram of a portion of the image of FIG. 7B.

FIG. 7C is a diagram of a portion of the image of FIG. 7B. Referring to FIGS. 7A-C, in the enlarged region 712, the dots represent pixels other than the identified pixel 714 having values that are compared to a range based on the identified pixel 714. In this example, the pixels are similar to FIG. 5D.

As the structure 704 and the corresponding effect on the image 710 is aligned to the rows and columns of the image, the pixels having the values to be compared and the identified pixel 714 are aligned to the structure 704. As a result, those pixels are aligned to the effects the of structure in the image 710.

In the enlarged portion 712, the identified pixel 714 is a pixel that is different due to the effect of the structure 704. However, the selected pixels are aligned to the effects of the structure 704. A range is generated based on the identified pixel 714 that is affected by the structure 704. However, the other pixels are aligned to the structure 704 and fall on pixels that are affected by the structure 704. As a result, the identified pixel 714 may not be classified as an aberrant pixel and may not be adjusted as described above. Accordingly, the pixels that are affected by the structure 704 may not be falsely identified as an aberrant pixel due to the effect of the structure 704.

Although particular pixels are used as examples of pixels having values that are compared to the range associated with the identified pixel 714, in other embodiments, the pixels may be different. As described above, the pixels may have a variety of different locations relative to the identified pixel 714. However, here, the pixels are selected to be aligned to the structure 704 such that when the identified pixel 714 falls on a portion of the image 710 that was affected by the structure 704, at least one of the other pixels is likely also affected by the structure 704 and within the expected range associated with the identified pixel 714. As a result, the identified pixel 714 is not classified as an aberrant pixel and is not adjusted to reduce or eliminate a chance that an effect of the structure 704 on the image 710 is misclassified as an aberrant pixel.

In the above described systems and operations, the focus has been on the operations with respect to a single identified pixel. However, the systems and operations may operate on more than one pixel of an image, including all pixels of an image.

Although a 3×3 matrix of pixels and a 5×5 matrix of pixels have been used as examples of pixels from which pixels other than an identified pixel may be selected, in other embodiments, the matrix of pixels may have other dimensions. For example, the matrix may be 1×3, 3×1, 3×5, 5×5, 5×3, 7×7, 9×9, 5×7, 7×5, or other similar configurations. Moreover, although a rectangular matrix has been used for various examples, in other embodiments, the pixels other than the identified pixel may be from a different shape, an irregular shape, or other configurations of pixels.

Some embodiments include a computer readable medium storing instructions that, when executed, cause the computer to perform one or more of the operations described above. For example, such instructions may include instructions for execution by the image processor 128 to implement the operations described above.

Referring to FIGS. 1A-4 and 6A-6C, some embodiments include a method, comprising: determining a value of an identified pixel 106 of a plurality of pixels 102 of an image from a detector 122; determining a noise value based on the value of the identified pixel 106 and the detector 122; determining a range 108 based on the noise value and the value of the identified pixel 106; comparing the range 108 and a value of at least one pixel 102 of the pixels 102 other than the identified pixel 106; and adjusting the value of the identified pixel 106 in response to the comparison.

In some embodiments, determining the range 108 comprises: calculating a lower limit of the range 108 by subtracting a product of the noise value and a first constant from the value of the identified pixel.

In some embodiments, determining the range 108 comprises: calculating an upper limit of the range 108 by adding a product of the noise value and a second constant and the value of the identified pixel.

Referring to FIG. 7A-7B, in some embodiments, the method includes modulating illumination incident on an imaging system including the detector 122 using a structure 704; and capturing the image in response to the modulated illumination; wherein the at least one pixel 102 and the identified pixel 106 are aligned with the structure 704.

Referring again to FIGS. 1A-4 and 6A-6C, in some embodiments, the method includes generating the noise value based on a noise model of the detector 122.

In some embodiments, the method includes detecting a change in a setting of a system including the detector 122; and changing a noise model for determining the noise in response to detecting the change.

In some embodiments, adjusting the value of the identified pixel 106 comprises generating a new value for the identified pixel 106 based on the at least one pixel 102 of the pixels 102 other than the identified pixel.

In some embodiments, adjusting the value of the identified pixel 106 comprises generating a new value for the identified pixel 106 based on at least one pixel 102 different from the at least one pixel 102 of the pixels 102 other than the identified pixel.

Referring to FIGS. 1A-6C, in some embodiments, not all pixels 102 immediately adjacent to the identified pixel 106 are part of the at least one pixel 102 of the pixels 102 other than the identified pixel 106.

In some embodiments, the at least one pixel 102 of the pixels 102 other than the identified pixel 102 are at least two pixels 102 immediately adjacent to the identified pixel 106.

In some embodiments, the image includes a plurality of channels; and the at least one pixel 102 of the pixels 102 other than the identified pixel 106 and the identified pixel 106 are pixels 102 of one of the channels.

Some embodiments include a system, comprising: a detector 122 configured to generate values for a plurality of pixels 102; and an image processor coupled to the detector 122 and configured to: determine a value of an identified pixel 106 of the pixels 102 of an image; determine a noise value based on the value of the identified pixel 106 and the detector 122; determine a range 108 based on the noise value and the value of the identified pixel 106; compare the range 108 and a value of at least one pixel 102 of the pixels 102 other than the identified pixel 106; and adjust the value of the identified pixel 106 in response to the comparison.

In some embodiments, the image processor is further configured to: calculate a lower limit of the range 108 by subtracting a product of the noise value and a first constant from the value of the identified pixel.

In some embodiments, the image processor is further configured to: calculate an upper limit of the range 108 by adding a product of the noise value and a second constant and the value of the identified pixel.

In some embodiments, the system of claim 12, further comprising: a structure 704 disposed relative to the detector 122 in a position that causes an effect in the image; wherein: the image processor is further configured to: modulate illumination incident on an imaging system including the detector 122 using a structure 704; and capture the image in response to the modulated illumination; and a combination of the at least one pixel 102 and the identified pixel 106 are aligned with the structure 704.

In some embodiments, the image processor is further configured to generate a new value for the identified pixel 106 based on the at least one pixel 102 of the pixels 102 other than the identified pixel.

In some embodiments, the image processor is further configured to generate a new value for the identified pixel 106 based on at least one pixel 102 different from the at least one pixel 102 of the pixels 102 other than the identified pixel.

In some embodiments, not all pixels 102 immediately adjacent to the identified pixel 106 are part of the at least one pixel 102 of the pixels 102 other than the identified pixel 106.

In some embodiments, the image includes a plurality of channels; and the at least one pixel 102 of the pixels 102 other than the identified pixel 106 and the identified pixel 106 are pixels 102 of one of the channels.

Some embodiments include a system, comprising: means for determining a value of an identified pixel 106 of a plurality of pixels 102 of an image from a detector 122; means for determining a noise value based on the value of the identified pixel 106 and the detector 122; means for determining a range 108 based on the noise value and the value of the identified pixel 106; means for comparing the range 108 and a value of at least one pixel 102 of the pixels 102 other than the identified pixel 106; and means for adjusting the value of the identified pixel 106 in response to the means for comparing.

Examples of the means for determining a value of an identified pixel 106 of a plurality of pixels 102 of an image from a detector 122 include the image processor 128 or 708 described above.

Examples of the means for determining a noise value based on the value of the identified pixel 106 and the detector 122 include the image processor 128 or 708 described above.

Examples of the means for determining a range 108 based on the noise value and the value of the identified pixel 106 include the image processor 128 or 708 described above.

Examples of the means for comparing the range 108 and a value of at least one pixel 102 of the pixels 102 other than the identified pixel 106 include the image processor 128 or 708 described above.

Examples of the means for adjusting the value of the identified pixel 106 in response to the means for comparing include the image processor 128 or 708 described above.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶ 6. Embodiments of the invention in which an exclusive property or privilege is claimed are defined as follows.

The invention claimed is:

1. A method, comprising:
   determining a value of an identified pixel of a plurality of pixels of an image from a detector;
   determining a noise value based on the value of the identified pixel and the detector;
   determining a range based on the noise value and the value of the identified pixel;
   comparing the range and a value of at least one pixel of the pixels other than the identified pixel; and
   adjusting the value of the identified pixel in response to the comparison.

2. The method of claim 1, wherein determining the range comprises:
   calculating a lower limit of the range by subtracting a product of the noise value and a first constant from the value of the identified pixel.

3. The method of claim 2, wherein determining the range comprises:
   calculating an upper limit of the range by adding a product of the noise value and a second constant and the value of the identified pixel.

4. The method of claim 1, further comprising:
   modulating illumination incident on an imaging system including the detector using a structure; and
   capturing the image in response to the modulated illumination;
   wherein the at least one pixel and the identified pixel are aligned with the structure.

5. The method of claim 1, further comprising generating the noise value based on a noise model of the detector.

6. The method of claim 1, further comprising:
   detecting a change in a setting of a system including the detector; and
   changing a noise model for determining the noise in response to detecting the change.

7. The method of claim 1, wherein adjusting the value of the identified pixel comprises generating a new value for the identified pixel based on the at least one pixel of the pixels other than the identified pixel.

8. The method of claim 1, wherein adjusting the value of the identified pixel comprises generating a new value for the identified pixel based on at least one pixel different from the at least one pixel of the pixels other than the identified pixel.

9. The method of claim 1, wherein not all pixels immediately adjacent to the identified pixel are part of the at least one pixel of the pixels other than the identified pixel.

10. The method of claim 1, wherein the at least one pixel of the pixels other than the identified pixel are at least two pixels immediately adjacent to the identified pixel.

11. The method of claim 1, wherein:
    the image includes a plurality of channels; and
    the at least one pixel of the pixels other than the identified pixel and the identified pixel are pixels of one of the channels.

12. A non-transitory computer readable medium having instructions stored thereon adapted to perform the method of claim 1.

13. A system, comprising:
    a detector configured to generate values for a plurality of pixels; and
    an image processor coupled to the detector and configured to:
        determine a value of an identified pixel of the pixels of an image;
        determine a noise value based on the value of the identified pixel and the detector;
        determine a range based on the noise value and the value of the identified pixel;
        compare the range and a value of at least one pixel of the pixels other than the identified pixel; and
        adjust the value of the identified pixel in response to the comparison.

14. The system of claim 13, wherein the image processor is further configured to:
    calculate a lower limit of the range by subtracting a product of the noise value and a first constant from the value of the identified pixel.

15. The system of claim 14, wherein the image processor is further configured to:
    calculate an upper limit of the range by adding a product of the noise value and a second constant and the value of the identified pixel.

16. The system of claim 13, further comprising:
    a structure disposed relative to the detector in a position that causes an effect in the image;
    wherein:
        the image processor is further configured to:
            modulate illumination incident on an imaging system including the detector using a structure; and
            capture the image in response to the modulated illumination; and
        a combination of the at least one pixel and the identified pixel are aligned with the structure.

17. The system of claim 13, wherein the image processor is further configured to generate a new value for the identified pixel based on the at least one pixel of the pixels other than the identified pixel.

18. The system of claim 13, wherein the image processor is further configured to generate a new value for the identified pixel based on at least one pixel different from the at least one pixel of the pixels other than the identified pixel.

19. The system of claim 13, wherein not all pixels immediately adjacent to the identified pixel are part of the at least one pixel of the pixels other than the identified pixel.

20. The system of claim 13, wherein:
    the image includes a plurality of channels; and
    the at least one pixel of the pixels other than the identified pixel and the identified pixel are pixels of one of the channels.

21. A system, comprising:
    means for determining a value of an identified pixel of a plurality of pixels of an image from a detector;
    means for determining a noise value based on the value of the identified pixel and the detector;
    means for determining a range based on the noise value and the value of the identified pixel;
    means for comparing the range and a value of at least one pixel of the pixels other than the identified pixel; and
    means for adjusting the value of the identified pixel in response to the means for comparing.

* * * * *